United States Patent
Dunlap et al.

(12) 
(10) Patent No.: US 6,633,097 B2
(45) Date of Patent: Oct. 14, 2003

(54) MECHANICAL JOINING FOR WATER-COOLED MOTOR FRAME

(75) Inventors: Robert A. Dunlap, Fort Wayne, IN (US); James R. Crowell, Huntertown, IN (US)

(73) Assignee: General Electric Company, Schenectady, NY (US)

( * ) Notice: Subject to any disclaimer, the term of this patent is extended or adjusted under 35 U.S.C. 154(b) by 18 days.

(21) Appl. No.: 09/682,501

(22) Filed: Sep. 10, 2001

(65) Prior Publication Data

US 2003/0048031 A1 Mar. 13, 2003

(51) Int. Cl.⁷ .............................. H02K 9/00; H02K 9/19
(52) U.S. Cl. ................ 310/54; 310/58; 310/65
(58) Field of Search ..................... 310/52, 54, 58, 310/59, 64, 65

(56) References Cited

U.S. PATENT DOCUMENTS 5,859,482 A * 1/1999 Crowell et al. ............... 310/58

* cited by examiner

Primary Examiner—Karl Eizo Tamai
(74) Attorney, Agent, or Firm—Karl A. Vick, Esq.; Armstrong Teasdale LLP

(57) ABSTRACT

A stator frame for an electric motor including a substantially cylindrical shaped body section having opposed ends, a cooling passageway extending through at least a portion of the body section, and at least one spacer bar. The cooling passageway includes a cooling conduit having an inlet port and an outlet port in flow communication with the cooling passageway. The spacer bar has a notched side and at least one finger extending therefrom such that the finger mechanically couples the spacer bar to the cooling conduit.

15 Claims, 5 Drawing Sheets

MECHANICAL JOINING FOR WATER-COOLED MOTOR FRAME

BACKGROUND OF THE INVENTION

This invention relates generally to electric motors, and more particularly to a stator frame for an electric motor.

Electric motors generate heat during operation as a result of both electrical and mechanical losses, and these motors typically are cooled for efficient operation of the motor. An excessively high motor temperature may result in motor bearing failure or damage to stator winding insulation.

Electric motors generally have an enclosure, or housing, that includes a frame and endshields. Two types of enclosures are "open" and "totally enclosed." Motors that include totally enclosed type enclosures are typically used in applications including airborne contaminants, e.g., dirt, oil, or mist. Both convection type cooling and conduction type cooling occurs within the enclosure, and some form of convection cooling occurs at the external surfaces of the enclosure. At least some known totally enclosed motor enclosures are liquid cooled and the motor enclosure is connected to a coolant supply that is in flow communication with a cooling circuit. The liquid coolant could, for example, be water, hydraulic oil, or other relatively low temperature process liquids.

In at least some known totally enclosed liquid cooled motor configurations, the stator frame includes a cooling passageway through which a cooling medium is directed to facilitate removing heat generated by the motor. The cooling passageway may include a cooling conduit. The cooling conduit is formed by welding tubing and stabilizing bars in a desired geometric configuration. Because of extensive welding and supplies, such motors are typically more expensive to fabricate than air cooled motors. Furthermore, because the cooling conduit includes a plurality of welds, liquid cooled motors are susceptible to corrosion and to liquid leaks. As corrosion builds-up within the cooling passageway over time, the overall heat transfer capability of the liquid cooled motor may degrade.

SUMMARY OF INVENTION

In one aspect, a stator frame is provided for an electric motor. The frame includes a substantially cylindrical shaped body section having opposed ends, a cooling passageway extending through at least a portion of the body section, and at least one spacer bar. The cooling passageway includes a cooling conduit having an inlet port and an outlet port in flow communication with the cooling passageway. The spacer bar has a notched side and at least one finger extending therefrom such that the finger mechanically couples the spacer bar to the cooling conduit.

In another aspect, an electric motor is provided having a stator frame including a substantially cylindrical shaped body section having opposed first and second ends, a cooling passageway extending through at least a portion of said body section, and at least one spacer bar. The first stator frame end having a first end shield secured thereto, and the second stator frame end having a second end shield secured thereto. The cooling passageway includes a cooling conduit having an inlet port and an outlet port in flow communication with the cooling passageway. The spacer bar has a notched side and at least one finger extending therefrom such that the finger mechanically couples the spacer bar to the cooling conduit.

In another aspect, a method is provided for fabricating a stator frame for an electric motor. The method includes arranging a cooling conduit into a selected configuration, mechanically coupling a spacer bar including a notched side to the cooling conduit, and securing the spacer bar to the cooling conduit by mechanically coupling at least one finger projecting outwardly from the spacer bar to the cooling conduit.

DETAILED DESCRIPTION

Figure 1:
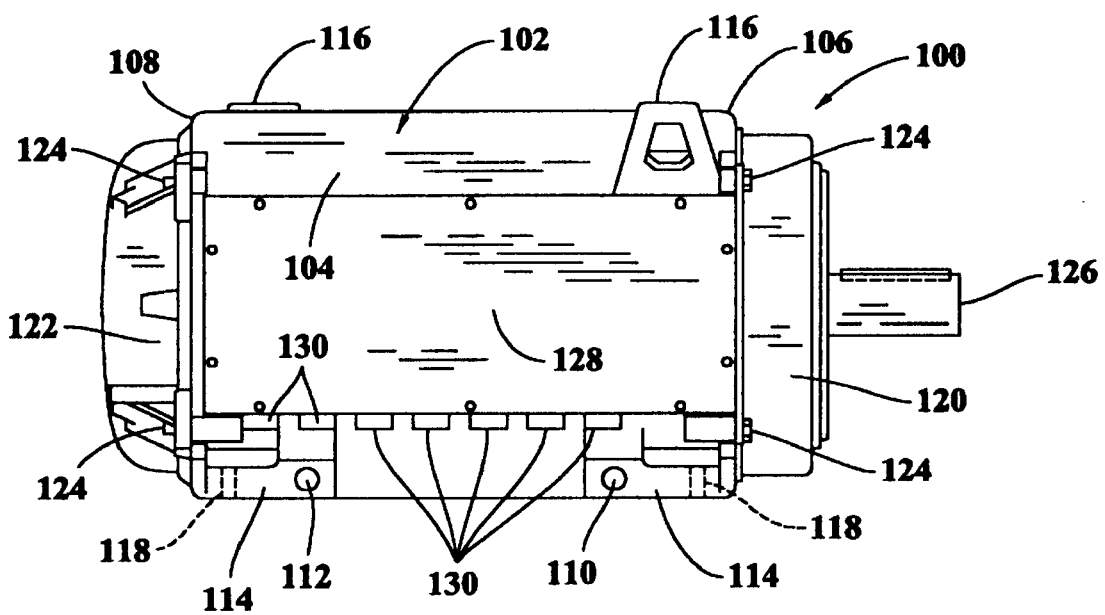
FIG. 1 is a side elevation view of a motor.
Figure 2:
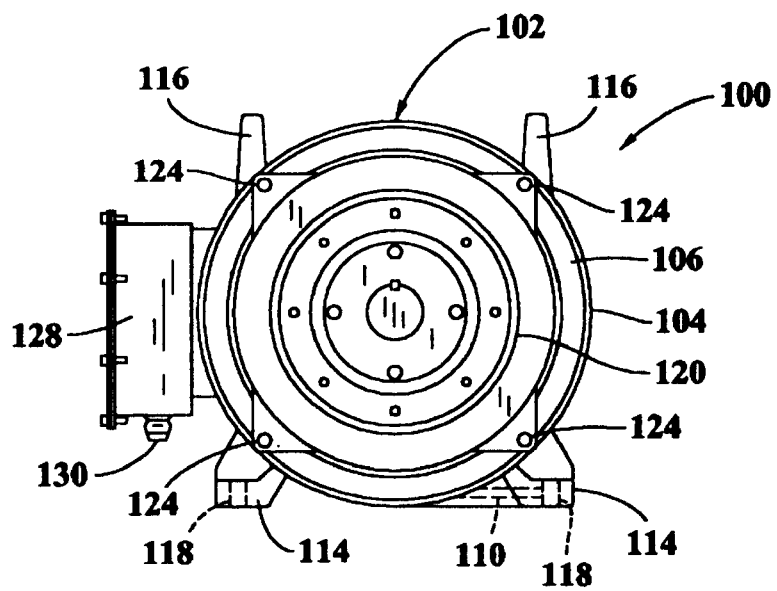
FIG. 2 is a front elevation view of the motor shown in FIG. 1.

FIGS. 1 and 2 are a side and front elevation view of a liquid cooled electric motor 100, respectively, including a stator frame 102 including a substantially cylindrical shaped body section 104 having opposed ends 106 and 108. A cooling inlet port 110 and a cooling outlet port 112 are in flow communication with a cooling conduit (not shown in FIGS. 1 and 2). Frame 102 also includes support feet 114 and lifting lugs or eye bolts 116. Bolt openings 118 are provided in support feet 114 to enable motor 100 to be secured in place. A pair of end shields 120 and 122 are secured to frame 102 by bolts 124 and opposed ends 106 and 108 of frame 102. Assembled end shields 120 and 122 and frame 102 are sometimes referred to as the enclosure or motor housing.

A stator core and windings (not shown) are secured within the motor housing, as is well known. A rotor shaft 126 is rotatably mounted within the housing and rotates relative to frame 102. A conduit box 128 is secured to stator frame 102. Conduit box 128 includes lead cable strain reliefs 130 positioned adjacent openings in conduit box 128. Power and control leads (not shown) extend through the openings in conduit box 128 and are electrically connected, for example, to the stator windings.

Figure 3:
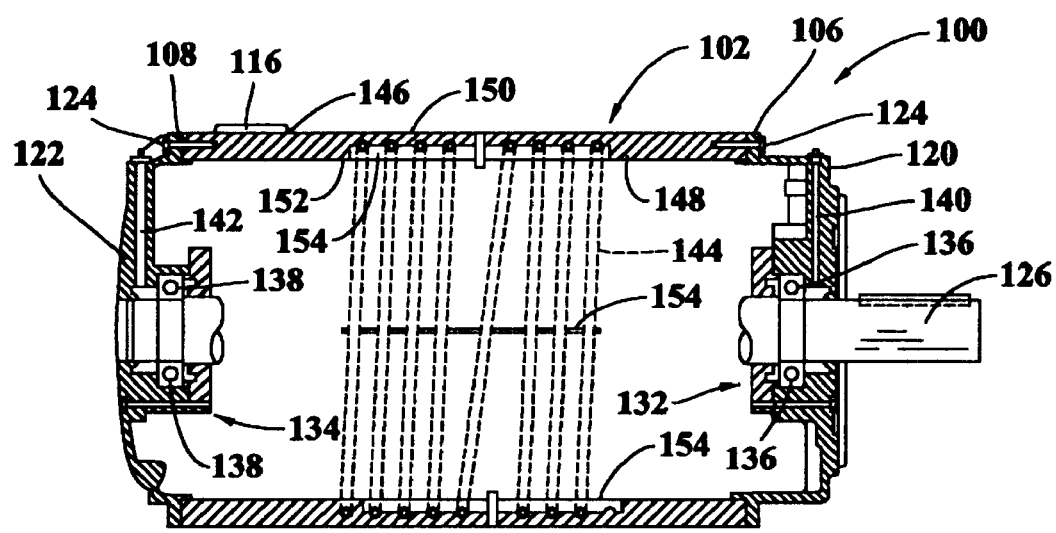
FIG. 3 is a partial cross-section view through the motor shown in FIG. 1.

FIG. 3 is a partial cross section view through motor 100. As shown in FIG. 3, bearing assemblies 132 and 134 are supported by end shields 120 and 122. Bearing assemblies 132 and 134 include bearings 136 and 138 for supporting rotor shaft 126. Grease inlet tubes 140 and 142 in flow communication with bearing assemblies 132 and 134 extend through end shields 120 and 122 and provide a passageway for supplying grease to bearings 136 and 138.

Cooling conduit 144 is located in stator frame 102. Frame 102 includes a substantially cylindrical shaped body section 146 formed by a wall 148 having an outer surface 150 and an inner surface 152. The cooling passageway is at least partially within wall 148 between inner and outer surfaces 150 and 152. Particularly, conduit 144 (sometimes referred to as a tube coil) has a generally helical shape and extends along a length of frame 102. Spacer, or stabilizer, bars 154 are engaged and mechanically coupled to conduit 144.

Figure 4:
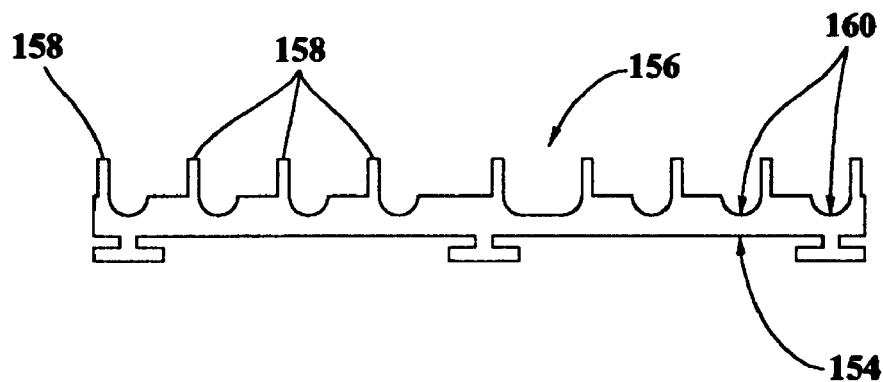
FIG. 4 is a front view of the spacer bar utilized in connection with the motor shown in FIG. 1.

FIG. 4 is a front view of spacer bars 154. Spacer bars 154 have a notched side 156 and at least one finger 158 extending outwardly from notched side 156. Notched side 156 has a plurality of notches 160 arranged along spacer bar 154 such that each notch corresponds with conduit 144. Each notch 160 has an inner radius slightly greater than the outer radius of conduit 144 (not shown in FIG. 4) such that spacer bar 154 engages conduit 144 when notched side 156 is positioned in contact with conduit 144. After spacer bar 154 engages conduit 144 at notched side 156, fingers 158 are crimped such that fingers 158 generally extend circumferentially around conduit 144 to mechanically couple spacer bar 154 to conduit 144.

Spacer bars 154 provide support for conduit 144 and maintain a desired spacing between lengths, or turns, of conduit 144. Spacer bars 154 also facilitate centering conduit 144 within cast frame wall 148 (not shown in FIG. 4) and locating conduit 144 axially within frame wall 148 during the casting process. Spacer bars 154 also can be used to determine the concentricity of cooling conduit 144 with respect to the stator frame machining operations.

Figure 6:
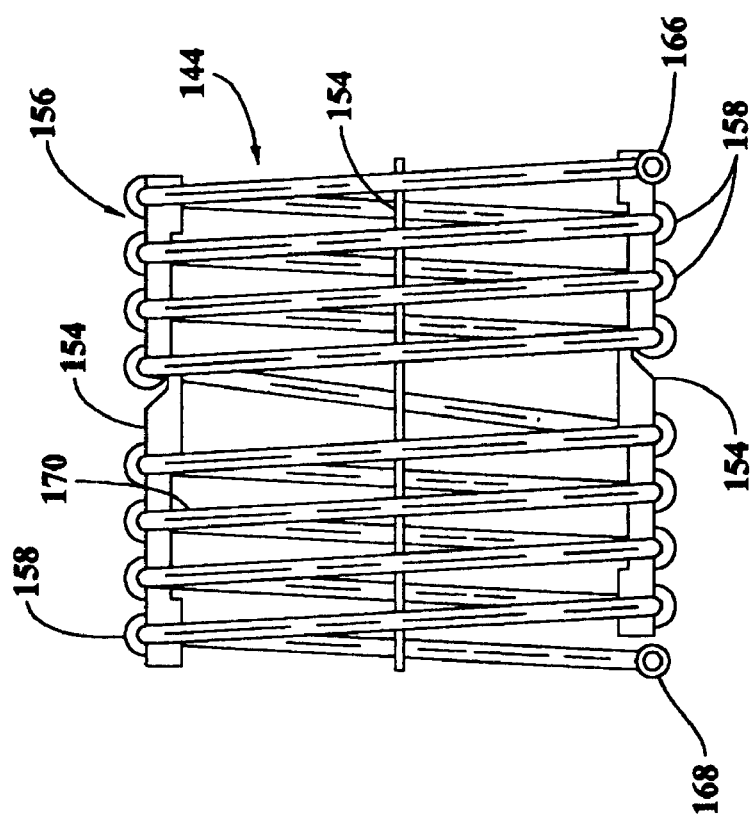
FIG. 6 is a side elevation view of the conduit shown in FIG. 5.
Figure 5:
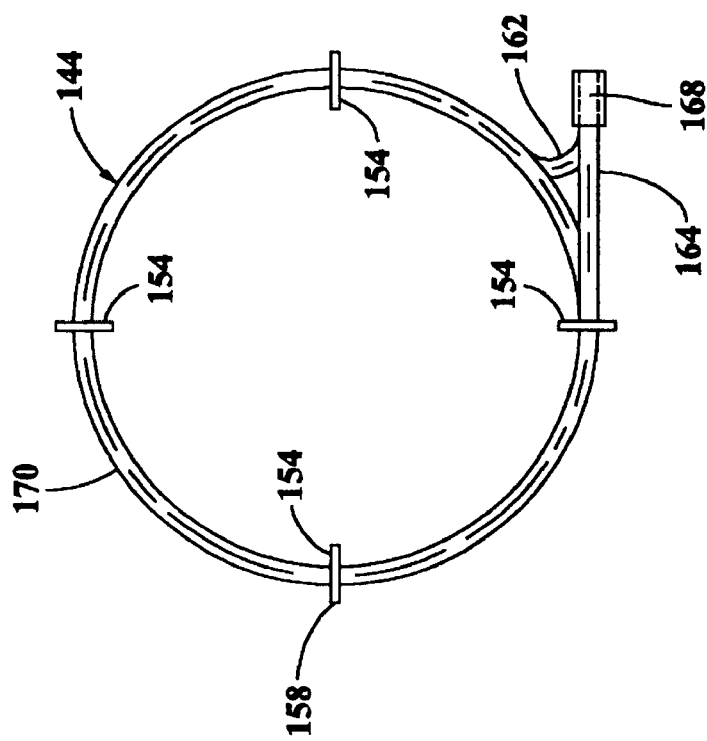
FIG. 5 is a front view of the cooling conduit utilized in connection with the motor shown in FIG. 1.
Figure 7:
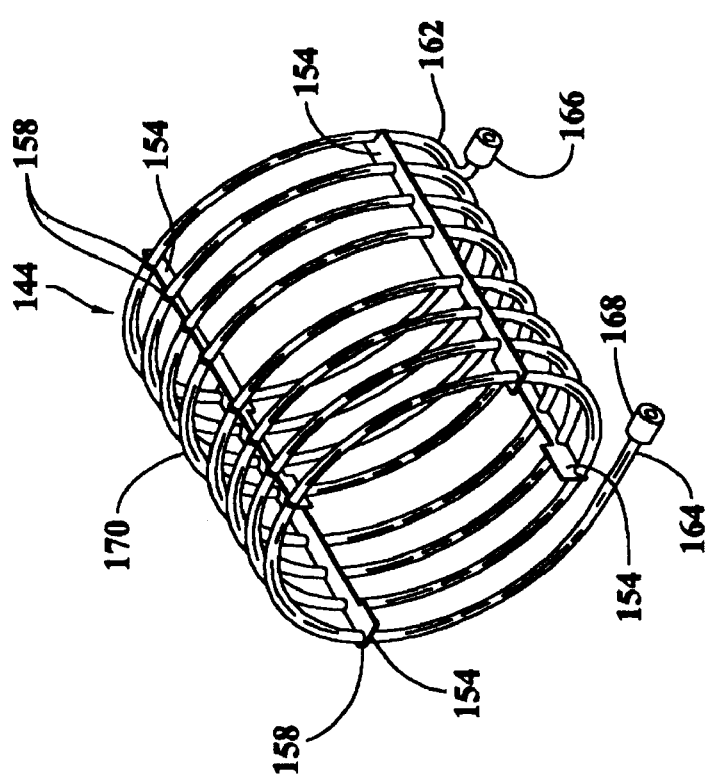
FIG. 7 is a perspective view of the conduit shown in FIG. 5.

FIGS. 5, 6 and 7 are a front, a side, and a perspective view, respectively, of cooling conduit 144. Conduit 144 includes an inlet end 162 and an outlet end 164. Each end 162 and 164 includes an enlarged tube section 166 and 168, respectively, that aligns with frame inlet and outlet ports 110 and 112, respectively (shown in FIG. 1). An intermediate portion 170 of conduit 144 has a generally helical shape. Enlarged tube sections 166 and 168 have an interior diameter (not shown) that is larger than an outer diameter (not shown) of conduit intermediate portion 170. Spacer bar 154 engages conduit 144 at notched side 156 and fingers 158 are crimped such that fingers 158 generally extend circumferentially around conduit 144 to mechanically couple spacer bar 154 to conduit 144.

With respect to motor 100 (shown in FIG. 1), and prior to operation, inlet and outlet ports 110 and 112 are coupled in a closed loop cooling circuit which includes, for example, a pump and a remote heat exchanger. Alternatively, an open loop cooling circuit is used. In operation, a cooling medium such as water flows through the cooling circuit. Particularly, to cool motor 100 during operation, the cooling medium is delivered to inlet port 110 and flows through conduit 144 to outlet port 112. As the cooling medium flows through conduit 144, heat generated by motor 100 is transferred to the medium through conduit 144. The heated cooling medium then flows out of frame 102 through outlet port 112, and the heated cooling medium is then pumped by the cooling circuit. The pumped cooling medium is circulated through a remote heat exchanger and returned to inlet port 110.

Cooling conduit 144 facilitates cooling the motor by removing excess heat from the motor. Of course, cooling conduit 144 is not limited to the exemplary helical configuration shown in the drawings discussed above and cooling conduit 144 may have many alternative geometric configurations.

Motor 100 including stator frame 102 with cast in place cooling conduit 144 has the advantages of a liquid cooled motor yet is believed to be assembled at a lower cost than known liquid cooled motors. These lower costs are achieved by casting preformed cooling conduit 144 in place within stator frame 102 at stator frame wall 148 (shown in FIG. 3) rather than requiring the significant machining, welding, and assembly time associated with other known water jackets. In addition, lower costs are facilitated by mechanically coupling spacer bars 154 to conduit 144 with fingers 158, and thus, eliminating time and materials used in welding the spacer bars in place, as is done with at least some known motors. Additionally, the material used in casting frame 102 can be selected to further reduce machining costs.

In addition, motor 100 is believed to be less susceptible to corrosion and liquid leaks as compared to at least some known liquid cooled motors. Specifically, because cooling conduit 144 is cast in place in frame 102, a possibility for leaks and internal corrosion is facilitated to be reduced as compared the possibility for leaks and corrosion which may result with other known water jackets. In addition, mechanically coupling spacer bars 154 to conduit 144 rather than welding facilitates reducing a possibility for leaks and corrosion. Additionally, the cooling conduit material may be selected to provide optimum corrosion resistance independent of the frame wall material. For example, the cooling conduit material may be stainless steel and the frame material may be gray iron.

Figure 8:
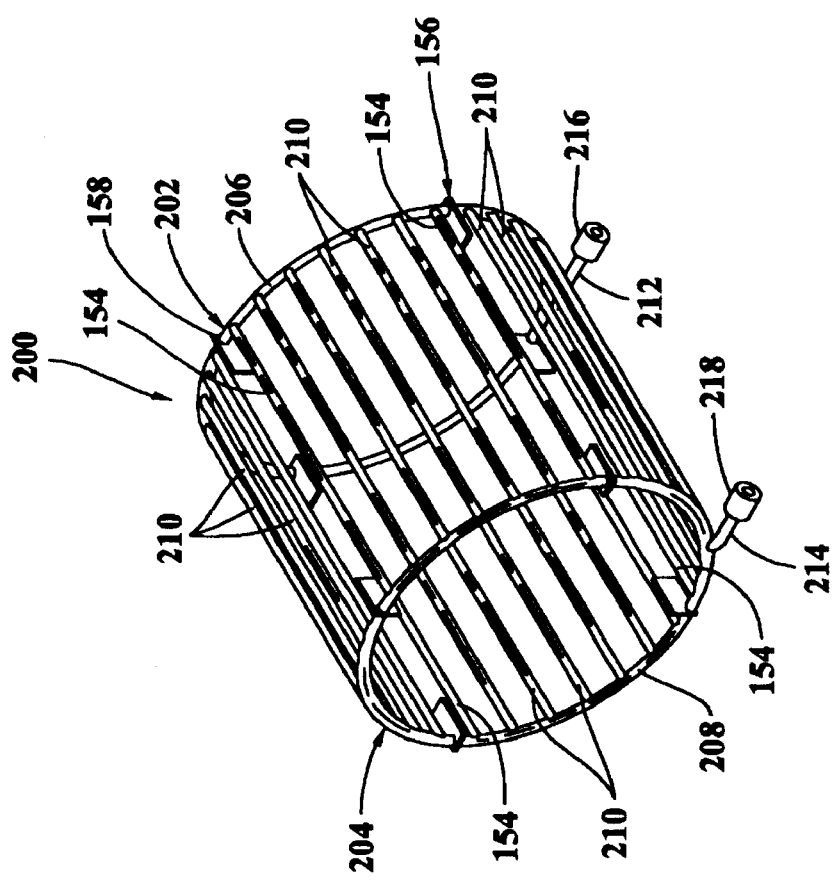
FIG. 8 is a perspective view of an alternative embodiment of the cooling conduit.

FIG. 8 is a perspective view of an alternative embodiment of a cooling conduit 200 having a squirrel cage configuration. Although shown by itself in FIG. 8, it should be understood that conduit 200 would be cast in place in a motor frame, such as frame 102 (shown in FIG. 1). Opposing ends 202 and 204 of conduit 200 include tube rings 206 and 208 having a generally circular shape, and straight tube segments 210 are coupled to, and extend between, rings 206 and 208. Each tube segment 210 is in flow communication with each ring 206 and 208. Tube rings 206 and 208 and tube segments 210 form the squirrel cage configuration of conduit 200. Inlet and outlet tubes 212 and 214 are coupled to respective rings 206 and 208. Enlarged tube sections 216 and 218 are located at the ends of tubes 212 and 214 and align with, for example, frame inlet and outlet ports 110 and 112 (shown in FIG. 1). Spacer bar 154 having notched side 156 and at least one finger 158 extending outwardly therefrom (shown in FIG. 4) engages rings 206 and 208, and fingers 158 are crimped such that fingers 158 generally extend circumferentially around rings 206 and 208 to mechanically couple spacer bar 154 to rings 206 and 208.

With squirrel cage conduit 200, and prior to operation, inlet and outlet tubes 212 and 214 are coupled in a cooling circuit which includes, for example, a pump. In operation, a cooling medium such as water flows through the cooling circuit. The heated cooling medium from the motor is pumped through a remote heat exchanger, and is returned to inlet tube 212.

Figure 9:
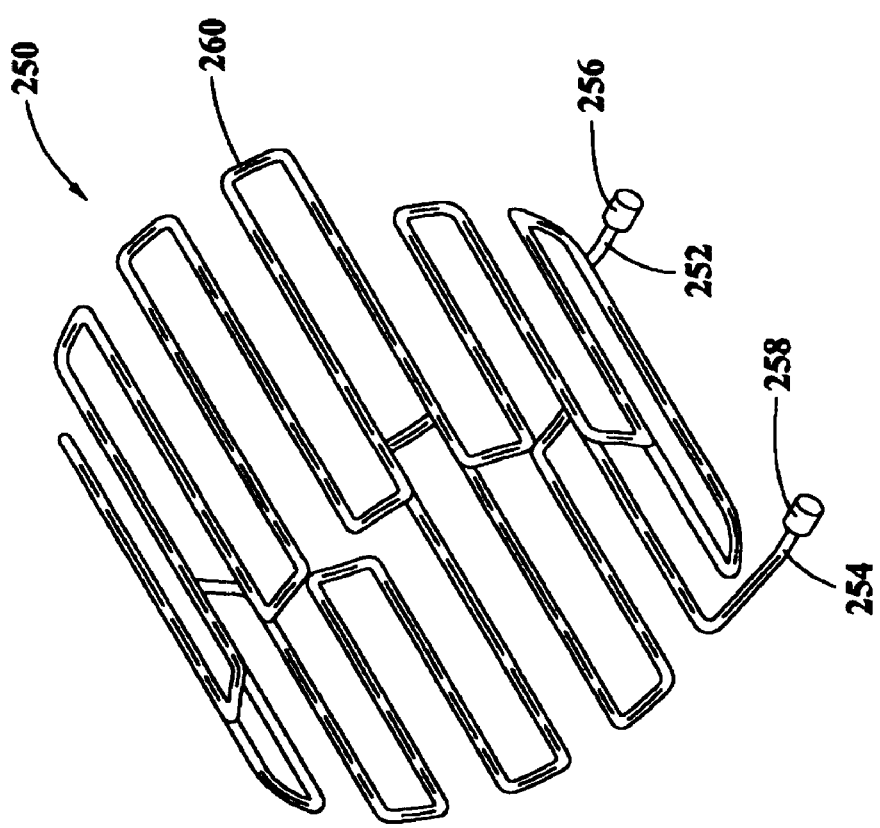
FIG. 9 is a perspective view of yet another alternative embodiment of the cooling conduit.

FIG. 9 is a perspective view of yet another alternative embodiment of a cooling conduit 250. Although shown by itself in FIG. 9, it should be understood that conduit 250 would be cast in place in a motor frame, such as frame 102 (shown in FIG. 1). Rather than a circumferential flow pattern as provided with cooling conduit 144 (shown in FIG. 7), water flows through conduit 250 in an axial flow pattern. Particularly, conduit 250 includes an inlet end 252 and an outlet end 254. Enlarged tube sections 256 and 258 are located at ends 252 and 254 and align with frame inlet and outlet ports 110 and 112 (shown in FIG. 1). An intermediate portion 260 of conduit 250 has a generally serpentine geometric shape. Spacer bars 154 having notched side 156 and at least one finger 158 extending outwardly therefrom (shown in FIG. 4) are mechanically coupled to conduit 250.

Prior to operation, inlet and outlet ends 252 and 254 are coupled in a cooling circuit which includes, for example, a pump and remote heat exchanger. In operation, the cooling medium is delivered to inlet end 252 and flows through conduit 250 to outlet end 254. As the cooling medium flows through conduit 250, heat is transferred to the medium through conduit 250. The heated cooling medium is then pumped by the cooling circuit pump through the remote heat exchanger, and the cooling medium is returned to inlet end 252.

While exemplary embodiments of the cooling conduit have been described above, it is contemplated that the cooling conduit can have many other configurations. Correspondingly, the spacer bars can have many other configurations. Therefore, it should be understood that the present invention is not limited to any particular geometric configuration of the cooling conduit nor any particular geometric configuration of the spacer bar.

The electric motor described herein provides the advantages of a liquid cooled motor at a lower cost while also facilitating a reduced likelihood of corrosion and liquid leaks as compared to some other known liquid cooled motors. Such lower costs and reduced likelihood of corrosion and liquid leaks are facilitated by providing that the preformed cooling conduit is cast in place rather than requiring the significant machining, welding, and assembly time associated with at least some known water jackets; by mechanically coupling the spacer bars to the cooling conduit with fingers, and thus, eliminating the need to weld the spacer bars in place as is done with at least some known motors; and by selecting the material used in casting the stator frame to further reduce machining costs and improve corrosion resistance.

While the invention has been described in terms of various specific embodiments, those skilled in the art will recognize that the invention can be practiced with modification within the spirit and scope of the claims.

What is claimed is:

1. A stator frame for an electric motor, said stator frame comprising:
    a substantially cylindrical shaped body section having opposed ends, and a cooling passageway extending through at least a portion of said body section, said cooling passageway comprising a cooling conduit;
    an inlet port and an outlet port in flow communication with said cooling passageway; and
    at least one spacer bar comprising a notched side and at least one finger projecting outwardly from said notched side, said at least one finger crimpable around said cooling conduit such that upon crimping said at least one finger extends circumferentially around said cooling conduit substantially surrounding said cooling conduit and mechanically coupling said spacer bar to said cooling conduit.

2. A stator frame in accordance with claim 1 wherein said body section comprises a wall comprising an outer surface and an inner surface, said cooling passageway at least partially within said wall between said inner surface and said outer surface.

3. A stator frame in accordance with claim 1 wherein said cooling conduit comprises an inlet end positioned at said inlet port, an outlet end positioned at said outlet port, and an intermediate portion extending therebetween.

4. A stator frame in accordance with claim 3 wherein said spacer bar notched side engages said cooling conduit intermediate portion such that said spacer bar finger secures said spacer bar to said cooling conduit intermediate portion.

5. A stator frame in accordance with claim 4 wherein said cooling conduit intermediate portion arranged in a generally helical geometric configuration.

6. A stator frame in accordance with claim 4 wherein said cooling conduit intermediate portion arranged in a generally serpentine geometric configuration.

7. A stator frame in accordance with claim 4 wherein said cooling conduit intermediate portion arranged in a squirrel cage configuration.

8. An electric motor, comprising:
    a stator frame comprising a substantially cylindrical shaped body section having opposed first and second ends, and a cooling passageway extending through at least a portion of said body section, said frame further comprising an inlet port and an outlet port in flow communication with said cooling passageway, said cooling passageway comprising a cooling conduit;
    a first end shield secured to said first stator frame end;
    at least one spacer bar mechanically coupled to said cooling conduit, said spacer bar comprising a notched side and at least one finger projecting outwardly from said notched side, said at least one finger crimpable around said cooling conduit such that upon crimping said at least one finger extends circumferentially around said cooling conduit substantially surrounding said cooling conduit and mechanically coupling said spacer bar to said cooling conduit.

9. An electric motor in accordance with claim 8 wherein said stator frame body section comprises a wall comprising an outer surface and an inner surface, said cooling passageway at least partially within said wall between said inner surface and said outer surface.

10. An electric motor in accordance with claim 8 wherein said cooling conduit comprises an inlet end positioned at said inlet port, an outlet end positioned at said outlet port, and an intermediate portion extending between said inlet and said outlet ends.

11. An electric motor in accordance with claim 10 wherein said spacer bar notched side engages said cooling conduit such that said spacer bar finger mechanically couples said spacer bar to said cooling conduit.

12. An electric motor in accordance with claim 10 wherein said cooling conduit intermediate portion is arranged in a generally helical geometric configuration.

13. An electric motor in accordance with claim 10 wherein said cooling conduit intermediate portion is arranged in a generally serpentine geometric configuration.

14. An electric motor in accordance with claim 10 wherein said cooling conduit intermediate portion is arranged in a squirrel cage configuration.

15. An electric motor in accordance with claim 10 wherein said spacer bar notched side has a plurality of fingers projecting outwardly such that said fingers mechanically couple said spacer bar to said cooling conduit.

* * * * *

UNITED STATES PATENT AND TRADEMARK OFFICE
CERTIFICATE OF CORRECTION

PATENT NO. : 6,633,097 B2
DATED : October 14, 2003
INVENTOR(S) : Dunlap et al.

It is certified that error appears in the above-identified patent and that said Letters Patent is hereby corrected as shown below:

Column 6,
Line 24, after "first stator frame end;" insert -- a second end shield secured to said second stator frame end; and --.

Signed and Sealed this

Twenty-seventh Day of December, 2005

JON W. DUDAS
*Director of the United States Patent and Trademark Office*